Sept. 26, 1939.   J. A. BOYER ET AL   2,173,835
METALLIC ARTICLE AND ITS MANUFACTURE
Filed Oct. 7, 1937   2 Sheets-Sheet 1

INVENTOR.
JOHN A. BOYER
WILLIAM P. FITZ-RANDOLPH
CARL G. ROSE
BY
ATTORNEY.

Patented Sept. 26, 1939

2,173,835

UNITED STATES PATENT OFFICE 2,173,835

METALLIC ARTICLE AND ITS MANUFACTURE

John A. Boyer and William P. Fitz-Randolph, Niagara Falls, and Carl G. Rose, Lewiston, N. Y., assignors to The Carborundum Company, Niagara Falls, N. Y., a corporation of Delaware Application October 7, 1937, Serial No. 167,810

7 Claims. (Cl. 51—280)

This invention relates to metallic articles and their manufacture, and particularly to objects in which non-metallic particles are bonded with or embedded in a metallic alloy. The invention also relates to articles formed from the sintering or coalescence of metal powders, and to the bonding of abrasive particles such as diamonds, boron carbide, silicon carbide and fused alumina.

One of the objects of the invention is to produce a hard, tough metallic article having the properties of a strong, high melting metal from a powdered mix which can be readily molded while cold. Another object is to produce an article in which the metal consists principally of a hard high melting solid solution, but in which one of the original ingredients is relatively soft or has a high degree of plasticity. A further object is to produce an alloy matrix which has the characteristics required for a satisfactory abrasive bond. A still further object is to produce an improved metal bonded abrasive article, and particularly one in which the principal cutting agent is an extremely hard abrasive such as the diamond. These and other objects will be apparent from the following description.

In producing a metallic alloy having a high degree of hardness, toughness and strength, it is usually necessary to employ as a base metal one of the relatively high melting metals such as iron, nickel and cobalt, which have melting points above 1400° C. These metals have very little plasticity when cold, and when it is attempted to mold them from powders, either very high pressures must be used, or some sort of temporary binder must be introduced into the mix. When a considerable proportion of non-metallic particles are added to the mix, the difficulty of molding is increased, owing to the discontinuity in the metal structure produced by the non-metallic material. For example, it is difficult or impossible to cold mold very thin metal bonded abrasive articles from mixes in which the bond consists entirely of a high melting metal without the use of extremely high pressures or the addition of agglutinants. High pressures require expensive equipment and tend to crush the abrasive, especially when the article is thin, and the addition of agglutinants is undesirable because of the necessity of having clean metal surfaces when the article is subsequently sintered.

We have found that certain metals which are comparatively low melting and which at the same time form solid solutions with iron, nickel and cobalt, have the property of imparting plasticity to a mix in which one or more of these high melting metals is the principal metallic ingredient. The addition of low melting solid solution forming elements not only produces a bond which is both harder and tougher than the high melting metal itself, but also makes possible the cold molding under moderate pressures of articles containing an appreciable quantity of non-metallic material.

The addition of relatively low melting solid solution forming elements has another advantage which is realized both when the articles are made by a cold molding process and when they are sintered under pressure. When the powdered metal mixture is heated, the low melting metal first melts, but as it is capable of being retained in the high melting metal in solid solution, it diffuses into the high melting metal, and as this diffusion takes place, the entire mass resolidifies. An unusual condition thus obtains, in which the mixture is partially liquid at a relatively low temperature, but becomes completely solid at a higher temperature. This intermediate stage in which the mix is partially liquid permits much more rapid and complete diffusion to form a homogeneous metallic alloy than is possible through the contact of solid metal particles alone. If pressure is applied during the sintering process, the incipient melting renders the mix plastic, and also facilitates diffusion, so that a dense homogeneous body can be produced. Even with cold molding and subsequent heating, diffusion is more rapid and complete than with bodies sintered entirely from high melting metals.

In regard to the specific metals or alloys which can be used, iron, nickel and cobalt will retain aluminum in solid solution up to appreciable proportions, and if aluminum is added to any of these metals in powdered form, the resulting mixture is sufficiently plastic so that it can be cold molded under moderate pressures. Iron, for example, will retain more than 30 per cent of aluminum in solid solution, and the resulting alloy is harder than pure iron itself. Iron, nickel and cobalt will retain zinc in solid solution to produce the same effect. Iron will retain tin in solid solution to produce a hard tough alloy which is harder than pure iron, even though one of the components is very soft. Nickel, cobalt and iron will also retain limited quantities (usually from about 5 to 10 per cent) of antimony and bismuth in solid solution. All of these solid solutions, while hard, are relatively tough and ductile. The methods of determining whether a metal is retained in solid solution or is present as a separate constituent are well known in the metallurgical art, and the above examples are illustrative of the type of alloy which can be used to produce the effects herein described. In general, a solid solution forming element having a melting point of about 700° C. or less should be used if the softness of the addition agent is to be utilized in imparting plasticity to the mix.

The solid solution alloys of iron, nickel and cobalt with the addition elements of the type herein described, or the alloys which consist for the greater part of these solid solutions, possess desirable characteristics for the retention of non-metallic particles in a metal matrix, and particularly for the bonding of abrasives such as diamonds, boron carbide, silicon carbide and fused alumina.

In the bonding of abrasives with metal, the cutting characteristics of the abrasive are not predictable from the metal or alloy used, and it is difficult to provide an alloy which has the characteristics required for a satisfactory abrasive bond. The non-metallic materials used for bonding abrasives are usually brittle, and efforts have been made to duplicate these brittle characteristics in metallic bonding agents. While a brittle bond is desirable for some applications because of the self-dressing characteristics it imparts to the wheel, brittleness tends to defeat the principal object of a metal bond, which is to increase the wear resistance or life of the wheel. In the bonding of expensive abrasives such as diamonds, a hard tough bond will retain the abrasive for a much longer time than a brittle one, and even a ductile bond can be self-dressing for the cutting of many materials. For example, a wheel in which the bond consists of a ductile solid solution alloy of iron, nickel or cobalt with one or more of the low melting metals of the type herein described, will cut glass, porcelain, silicon carbide and other hard carbides indefinitely without the necessity of dressing the wheel. The diamonds in this type of wheel are retained to such an extent that there is very little wheel loss during cutting or grinding. In the cutting of more ductile materials such as sintered or bonded tungsten carbide, it is desirable to dress the wheel occasionally during use. This dressing, however, is necessary with many other types of abrasive wheel, and can be accomplished in a few seconds by rotating the wheel while wet against a piece of weakly bonded or porous abrasive such as bonded silicon carbide or bonded fused alumina. As a metal bonded diamond wheel will cut these materials with very little wheel loss, the grinding efficiency, including the dressing, is much greater than is the case with a brittle bond where the bond continually chips out, with consequent loss of abrasive, during grinding.

Typical examples of equilibrium relations of alloys which can be used in carrying out the invention, together with illustrative examples of metal bonded articles and methods of sintering them, are shown in the accompanying drawings.

Figure 1:
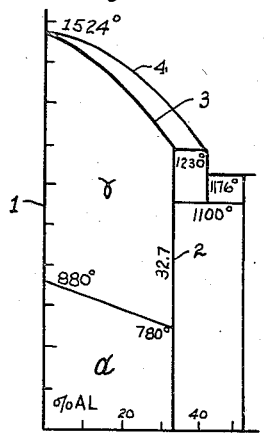
Figure 1 shows a portion of an equilibrium diagram in which the solid solubility of aluminum in iron is illustrated.

The diagram shown in Figure 1 is the usual type of equilibrium diagram well known in metallurgical practice. The composition of the alloy is plotted against the melting temperature of the alloy, or against any transition or phase change which takes place with varying temperature. Any composition in the field between the lines 1 and 2, which represents a composition range up to about 33% aluminum, consists of a homogeneous solid solution, that is, a single phase in which only one metallic constituent is present. This solid solution is harder than pure iron, although it contains a relatively soft ingredient. The curve 3 represents the temperature of incipient melting of alloys within this range of composition, and the curve 4 represents the temperature of complete melting.

Figure 2:
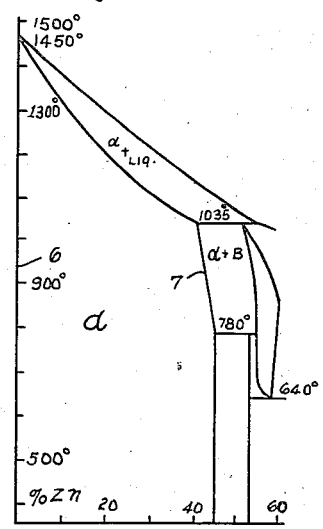
Figure 2 shows a portion of an equilibrium diagram illustrating the solid solubility of zinc in nickel.

The same approximate relations obtain with nickel and zinc, as is shown by the diagram in Figure 2. In this figure, all compositions between the ordinate 6 and the vertical line 7 are homogeneous solid solutions. As will be observed from the diagram, nickel will retain up to about 45% of zinc in solid solution under equilibrium conditions. After this composition is reached, the alloy contains two constituents.

The solid solutions indicated in the diagrams shown in Figures 1 and 2 are ordinarily designated in metallurgical practice as "alpha" solid solutions. In solid solutions of this type, a pure metal forms the basis for the lattice structure as determined by X-ray diffraction, and the addition of the second metal merely produces a change in the lattice dimensions without producing a second or undissolved constituent, or a change in atomic arrangement. In the iron-aluminum series, a second constituent appears after the composition of 33% aluminum is reached. This constituent is harder than the "alpha" solid solution, and may be used for embrittling the alloy if a brittle bond should be desired. This embrittlement by exceeding the solid solubility limits can also be produced in the other alloy series described. For example, a second constituent appears in the nickel zinc series when the zinc content exceeds approximately 45 per cent.

Specific examples of hard solid solution alloys which can be formed from iron, nickel and cobalt as a base by the addition of low melting metals having a higher degree of plasticity than the base metal are as follows:

Iron-aluminum, up to about 30% aluminum.
Nickel-aluminum, up to about 15% aluminum.
Cobalt-aluminum, up to about 10% aluminum.
Iron-tin, up to about 15% tin.
Nickel-tin, up to about 15% tin.
Cobalt-tin, relatively small percentages of tin.
Iron-zinc, up to about 20% zinc.
Nickel-zinc, up to about 45% zinc.
Cobalt-zinc, solid solubility limits not determined accurately but cobalt can retain substantial percentages of zinc in solid solution.

In making articles from metal powders in which the mix consists principally of a high melting metal or mixture of high melting metals such as iron, nickel and cobalt, the addition of low melting metals such as aluminum, zinc and tin makes possible the satisfactory cold molding under pressures as low as from 5,000 to 10,000 pounds per square inch. Higher pressures may be necessary with the addition of substantial proportions of non-metallic materials to the metal mixture. The pressure required will of course vary with the amount of non-metallic material included in the mix.

Figure 3:
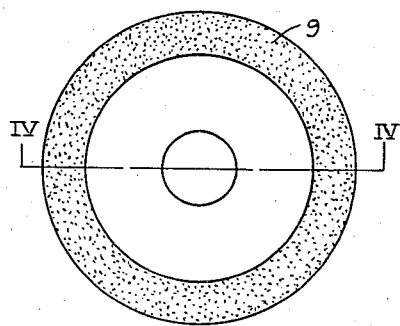
Figure 3 shows a plan view of an abrasive wheel of a type suitable for the cutting of extremely hard materials such as tungsten carbide.
Figure 4:
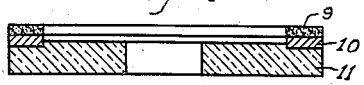
Figure 4 shows a section of the wheel illustrated in Figure 3, the section being taken along the lines IV—IV.

A method of making an abrasive wheel of the type shown in Figures 3 and 4 can be illustrated by specific examples, although it will be understood that other compositions and methods of molding and sintering can be used. A mixture of, for example 10% diamonds of from 80 to 140 grit, 10% silicon carbide of from 140 to 600 grit and 80% of a powdered metal mixture of the type described is introduced into a ring-shaped mold to form the cutting surface 9 of the wheel shown in Figures 3 and 4. The mix containing the diamonds is accurately levelled off and the backing mixture of 20% silicon carbide and 80% metal powder is added to the mold to form the backing 10. If the material is cold molded, the entire mass is then pressed into a ring under a pressure of for example from 5000 to 50,000 pounds per square inch depending upon the degree of consolidation desired and the amount of non-metallic material included in the mix. The ring, after removal from the mold, can be sintered in an atmosphere which is non-reactive with respect to both the metallic ingredients and the diamonds. This sintering can be carried out without the application of further consolidating pressure, but it is desirable to apply at least a slight pressure to the ring during sintering in order to prevent warping. The sintering temperature will of course vary with the particular alloy and the quantity of non-metallic material used, but in general sintering temperatures approximately 1000° C. are satisfactory. For alloys containing fairly high percentages of zinc or other low melting materials, the sintering temperature should be maintained at from 50 to 150° C. below the melting temperature of the alloy produced. If zinc is used, heating should be gradual in order to secure alloying before vaporization of the zinc takes place. The article can be sintered under a pressure greater than one atmosphere if desired.

After the ring has been sintered it can be mounted upon a suitable backing 11 so that it can be used as an abrasive wheel or lap. This backing can consist of a reversible thermoplastic resin or can be made of metal or other suitable material.

In making up the mix from metal powder it is desirable to use the ingredients forming the alloy rather than comminuted alloy material in order to obtain the advantage of the plasticity imparted by the lower melting metal. It is possible, however, to produce a satisfactory abrasive bond by comminuting previously alloyed material providing sufficient pressure is applied to secure satisfactory molding. Previously alloyed material can also be used if the article is to be sintered under pressure. With high percentages of zinc or aluminum, a mixture of previously alloyed material and the component metal powders can be used to advantage.

Figure 5:
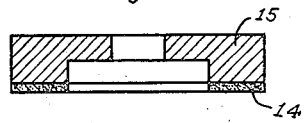
Figure 5 shows a section of a cup wheel having a metal bonded abrasive surface.

Figure 5 shows a section of a cup wheel which has been found suitable for the surfacing of refractories such as silicon carbide of fireclay bricks and shapes. The abrasive layer 14 may consist of diamonds bonded with or embedded in metal, or can be a mixture of diamonds, silicon carbide or other abrasive, and metal. The backing 15 can be of resin, metal or any suitable material. It is desirable, however, to make the backing fairly light so that the wheel can be readily handled for surfacing operations. For this purpose, aluminum, magnesium, or other light alloys can be used. Solid solution alloys of nickel, cobalt and iron with low melting metals such as aluminum, tin and zinc have been found very satisfactory as bonds for wheels of this type.

Figure 6:
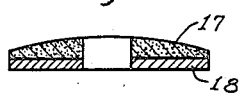
Figure 6 shows a lens grinding lap made from metal bonded abrasive.

Figure 6 shows a section of a lens grinding lap, in which the curved portion 17, which is molded to the contour desired for lens grinding, consists of a sintered mixture of diamonds and an alloy of a metal of the iron group of the type herein described. Silicon carbide, fused alumina, or other abrasive can be included with the diamonds if desired. The abrasive portion 17 can be sintered directly to a metal backing 18, or the backing can be molded to the previously formed abrasive section or otherwise attached. If the backing is to be molded to the pre-formed abrasive portion, it can consist of a thermoplastic resin or any suitable moulding compound.

Figure 7:
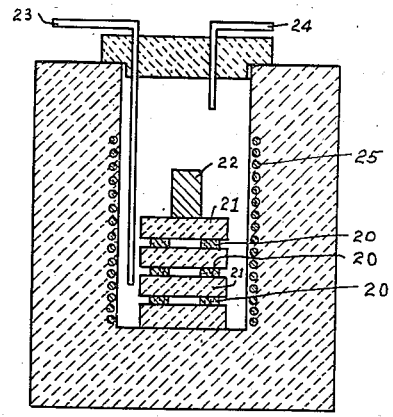
Figure 7 shows a method of sintering ring wheels of the type illustrated in Figure 3.

Figure 7 illustrates a method of sintering a number of abrasive rings of the type shown in Figure 3. The abrasive rings 20 are placed between ceramic bats 21, which are maintained in place by the weight 22. The light pressure applied to the rings during sintering prevents warping. A gas which is inert to both the metal and the diamonds can be introduced into the furnace chamber through the pipe 23, and allowed to escape through the outlet 24. The furnace is heated by means of the wire resistance element 25.

Figure 8:
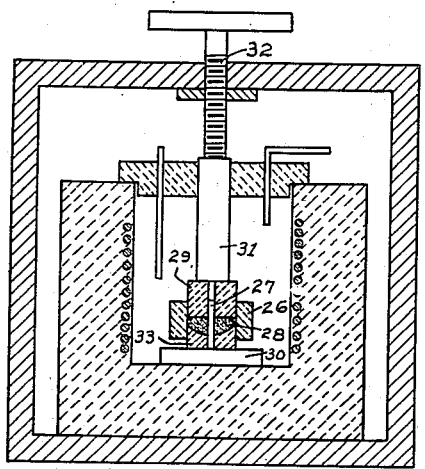
Figure 8 shows a method of sintering in which pressure is applied during the heating operation.

Figure 8 shows a method of sintering a glass grinding lap under pressure. This method has been found especially advantageous in the sintering of the metals of the iron group to which have been added low melting solid solution forming elements, owing to the plasticity afforded by the low melting ingredient. In assembling the apparatus, the curved portion of the mold 33 is inserted in the ring 26, and the pin 27 is then inserted. After the mix 28 is distributed in the mold, the plunger 29 is inserted within the ring 26 so as to engage with the pin 27. The assembled mold is then positioned on the base plate 30 and pressure applied through the rod 31 by means of the screw jack 32. A protective atmosphere can be applied as indicated.

Having thus described our invention, we claim:

1. A metal bonded abrasive article comprising abrasive particles and a sintered bond consisting principally of an alpha solid solution in which the metal forming the basic lattice structure is a metal of the iron group, and the metal retained in solid solution is of the group of low-melting amphoteric metals consisting of aluminum, zinc and tin.

2. A metal bonded abrasive article comprising diamonds and a sintered bond consisting principally of a metal of the iron group in which aluminum is retained in solid solution.

3. A metal bonded abrasive article comprising diamonds and a sintered bond consisting principally of a metal of the iron group in which zinc is retained in solid solution.

4. A metal bonded abrasive article comprising diamonds and a sintered bond consisting principally of an alloy of iron and tin in which at least a part of the tin is retained in solid solution in the iron.

5. A metal bonded abrasive comprising diamonds and a sintered bond consisting principally of iron in which aluminum is retained in solid solution.

6. A metal bonded abrasive comprising diamonds and a sintered bond consisting principally of nickel in which aluminum is retained in solid solution.

7. A metal bonded abrasive comprising diamonds and a sintered bond consisting principally of cobalt in which aluminum is retained in solid solution.

JOHN A. BOYER.
WILLIAM P. FITZ-RANDOLPH.
CARL G. ROSE.